United States Patent [19]

Nomori et al.

[11] Patent Number: 5,094,930
[45] Date of Patent: Mar. 10, 1992

[54] ELECTROPHOTOGRAPHIC PHOTORECEPTOR

[75] Inventors: Hiroyuki Nomori; Katumi Matuura, both of Hachioji, Japan

[73] Assignee: Konica Corporation, Tokyo, Japan

[21] Appl. No.: 435,360

[22] Filed: Nov. 13, 1989

[30] Foreign Application Priority Data

Nov. 15, 1988 [JP] Japan .................. 63-286845
Dec. 6, 1988 [JP] Japan .................. 63-306908

[51] Int. Cl.[5] .................. G03G 5/06; G03G 5/087
[52] U.S. Cl. .................. 430/96; 430/58; 525/479
[58] Field of Search .................. 430/58, 96; 252/500; 525/479; 528/26

[56] References Cited

U.S. PATENT DOCUMENTS 4,618,551 10/1986 Stolka .................. 430/58
4,774,159 9/1988 Stolka .................. 430/58
4,871,646 10/1989 Hayase et al. .................. 430/192

Primary Examiner—Roland Martin
Attorney, Agent, or Firm—Jordan B. Bierman

[57] ABSTRACT

An electrophotographic photoreceptor is disclosed which has a photosensitive layer comprising block a copolymer composed of a polymer block A comprising a polysilane and a polymer block B comprising a polymer of anionic polymerizable monomers; or a graft copolymer composed of the polymer block A and a polymer block C comprising another polymer as a positive hole transportation material. The photoreceptor is excellent in the mechanical strength, stable chargeability and photosensitivity.

6 Claims, 1 Drawing Sheet

ELECTROPHOTOGRAPHIC PHOTORECEPTOR

FIELD OF THE INVENTION

The present invention relates to an electrophotographic photoreceptor containing a novel positive hole-trasport material.

BACKGROUND OF THE INVENTION

Conventionally, an inorganic photoreceptor comprising an inorganic photosensitive layer composed of an inorganic photoconductive compound, such as selenium, zinc oxide or cadmium sulfide, has been widely used as an electrophotographic photoreceptor.

Such an inorganic photoreceptor, however, is not always satisfactory in respect of the sensitivity, thermal stability, moisture resistance and durability. For example, an inorganic photoreceptor having a selenium photosensitive layer, when placed under a high temperature condition, tends to be crystallized, thus deteriorating the characteristics as of an electrophotographic photoreceptor, so that the manufacturing process thereof needs a strict temperature control and to be prevented from being crystallized due to heat or finger prints in handling. Also, an inorganic photoreceptor having an inorganic photosensitive layer comprised of cadmium sulfide or zinc oxide is inferior in the moisture resistance and durability.

Due to such circumstances, the research and development of organic photoreceptors having an organic photosensitive layer containing an organic photoconductive compound have been extensively carried on in recent years.

For example, Japanese Patent Examined Publication No. 10496/1975 discloses an organic photoreceptor having an organic photosensitive layer containing poly-N-vinylcarbazole and 2,4,7-trinitro-9-fluorenone. The organic photoreceptor, however, is still inadequate in the photosensitivity and durability.

On the other hand, an organic photoreceptor having a function separation-type organic photosensitive layer, containing two different materials, one for a carrier, positive hole or electron, generation function and the other for a carrier, positive hole or electron, transport function, have been developed lately.

Such an organic photoreceptor has the advantage that the range of choice of a material to constitue the photosensitive layer is so much wide that any organic photoreceptor having a variety of characteristics can relatively easily be prepared.

As the carrier generation material for carrier generation function, various azo compounds are in practical use, while as the carrier transport material for carrier transport function, there are those materials proposed in Japanese Patent Open to Public Inspection (hereinafter referred to as Japanese Patent O.P.I. Publication) Nos. 94829/1976, 72231/1977, 27033/1978, 52063/1980, 65440/1983 and 198425/1983.

An organic photoreceptor prepared with the above carrier transport material, however, has the disadvantage that its carrier transportability is inadequate to result in the lowering of the sensitivity or the rise of the residual potential particularly when applied to a high-speed copying process under a low-temperature environmental condition.

Under the circumstances, a technique to use a polysilane of a specific structure as a carrier or positive-hole transport material has recently been proposed; see Japanese Patent O.P.I. Publication No 170747/1986. The polysilane, since it has a self-layer-formability unlike the aforementioned carrier transport material, enables to easily form a film-state photosensitive layer without combination with a binder. And in the silane, the mobility of positive hole is on the order of about $10^{-4}$ $cm^2/V.sec$, one figure larger than that of the foregoing carrier transport material, and thus the use of this material solves the disadvantage of the organic photoreceptor constituted with the above-mentioned carrier transport material.

However, a photosensitive layer prepared with the polysilane has problems: One problem is that the layer's strength is generally low, so that, when repeatedly used in an electrophotographic process, the layer surface is damaged or peeled by a scratching force caused by a toner in the development process or by a cleaning member in the cleaning process, and as a result, on the obtained copy image defects such as white or dark streaks appear in an early stage, thus deteriorating the resulting image. Another is that the polysilane has a relatively small dark resistance, so that an organic photoreceptor prepared with the material has an insufficient chargeability.

In order to increase the layer strength of a photosensitive layer, the inventers have attempted to combine the polysilane with other polymer to form a photosensitive layer, but have now found that, in a way of merely mixing both, because of the bad compatibility of the polysilane with other polymers, a phase separation occurs between them, so that no sufficient effect is exhibited.

SUMMARY OF THE INVENTION

It is an object of the invention to provide an electrophotographic photoreceptor excellent in the mechanical durability as well as in the chargeability and sensitivity.

The above object of the invention is accomplished by an elctrophotographic photoreceptor having a photosensitive layer comprising
  a block copolymer composed of a polymer block A comprising a polysilane and a polymer block B comprising a polymer of anionic polymerizable monomers; or
  a graft copolymer composed of said polymer block A and a polymer block C comprising another polymer.

DETAILED DESCRIPTION OF THE INVENTION

The positive hole-transport substance used in the invention comprises a block copolymer composed of a polymer block A comprising a polysilane and a polymer block B comprising a polymer of anionic polymerizable monomers or a graft copolymer composed of the polymer block A and a polymer block C comprising a polymer different from the polymer of block A. The anionic polymerizable monomer relating to the invention is a monomer which is capable of forming a anionic terminal group at the terminal portion of the polymer upon polymerizing reaction thereof. Anionic polymerizing chain reaction is progressed by the anionic terminal group. The polymer block A and the polymer block B or block C are chemically combined, so that the material, without arousing a problem of phase separation between the polymer blocks, exhibits an excellent positive hole-transport function due to the polymer block A comprising the polysilane, and at the same time shows a sufficient dark resistance as well as a sufficient mechanical strength due to the polymer block B or block C.

And the electrophotographic photoreceptor of the invention, since it has an organic photosensitive layer containing the above-mentioned specific positive hole-transport substance, exhibits excellent chargeability and sensitivity, and at the same time, the photosensitive layer has a good mechanical strength enough to enable quality images to be stably formed repeatedly in the electrophotographic copying process.

The positive hole-transport material to be used in the electrophotographic photoreceptor of the invention will be described in detail.

[1] Positive Hole-Transport Material

The positive hole-transport material of the invention comprises a block copolymer composed of the polymer block A comprising a polysilane and a polymer block B or a graft copolymer composed of the polymer block A and the polymer block C.

Polymer Block A

The polysilane, which constitutes the polymer block A, is a general term for those organic compounds composed mainly of silicon in place of carbon, and includes a variety of polymers.

Preferred ones as the polysilane are those homopolymers, copolymers and terpolymers represented by the following Formula (a).

wherein $R^1$, $R^2$, $R^3$, $R^4$, $R^5$ and $R^6$ each represents a hydrogen atom, an alkyl group or a substituted alkyl group, an aryl group or a substituted aryl group, an alkoxy group or a substituted alkoxy group, a silyl group or a substituted silyl group, a silylidene group or a substituted dilylidene group, or a silylidine group or a substituted silylidine group, provided that these Rs may be either the same as or different from one another; m, n and p represent the proportion of the respective monomers constituting the whole polymer.

The polymer block A comprising such a polysilane has a number average degree of polymerization of preferably 10 to 50,000. The respective monomer units of the polysilane may be distributed either at random all over the whole polymer block A or in block.

The alkyl group represented by $R^1$ through $R^6$ of Formula (a) is a straight-chain or branched-chain alkyl group having 1 to 24 carbon atoms, and preferably 1 to 8 carbon atoms, such as a methyl group, an ethyl group, a propyl group, a butyl group, an amyl group, a hexyl group, an octyl group, a nonyl group, a decyl group, a pentadecyl group, a stearyl group; a cycloalkyl group such as cyclohexyl; an unsaturated alkyl group including an allyl group or a substituted one of these alkyl groups. The particularly preferred alkyl groups are a methyl group, an ethyl group, a propyl group and a butyl group.

The aryl group is one having preferably 6 to 24 carbon atoms, such as a phenyl group, a naphthyl group or an anthryl group.

The alkoxy group is one having preferably 1 to 10 carbon atoms, such as a methoxy group, an ethoxy group, a propoxy group or butoxy group.

The substituent in a substituted alkyl group, a substituted aryl group, a substituted alkoxy group, a substituted silyl group, a substituted silylidene group or a substituted silylidine group is, for example, an alkyl group, an aryl group, a halogen atom, a nitro group, an amino group, an alkoxy group, a cyano group.

The substituted silyl group is, for example, $SiH(CH_3)_2$—, $Si(CH_3)_3$—, $Si(C_2H_5)_3$—, $Si(C_3H_7)_3$—, S—$(C_4H_9)_3$—, $Si^9CH_3)_2(C_2H_5)$—, $Si(CH_3)(C_2H_5)_2$—, $Si(CH_3)_2(C_6H_5)$— or $Si(CH_3)_2(C_6H_5CH_2)$—.

The substituted silylidene group is, e.g.,

And the substituted silylidine group is, e.g., SiH—,

These silylidene and silylidine groups are linked with other silylidene and silylidine groups inside the same polymer block or of the other polymer block.

Examples of the polysilane include polycyclotrimethylenesilane, polycyclopentamethylenesilane, poly-2-acetoxyethylmethylsilane, polytertiarybutylmethylsilane, poly-di-t-butylsilane-co-dimethylsilane, polymethylphenylsilane-co-dimethylsilane, polycyanoethylmethylsilane, poly-n-propylmethylsilane, poly-p-tolylmethylsilane, polycyclohexylmethylsilane, polycyclotetramethylenesilane, poly-2-carbomethoxyethoxyethylmethylsilane, polyphenylethylsilane, and polydiphenylsilane-co-phenylmethylsilane.

Polymer Block B

The anionic polymerizable monomer to constitute the polymer block B is not particularly restricted as long as it enables to obtain a polymer having a large mechanical strength, and is preferably selected from the group consisting of styrene and its derivative, α-methylstyrene and its derivative, acrylates, methacrylates, isoprene, substituted isoprene, butadiene, substituted butadiene, acrylonitrile, methacrylonitrile, and alkyl-vinyl ketones such as methyl-vinyl ketone, α-methylmethyl-vinyl ketone.

The polymer of the polymer block B may be formed either from single monomers or from 2 or more different monomers.

Examples of the polymer block B include polymethyl methacrylate, polystyrene, poly-α-methylstyrene, polymethyl acrylate, polyisoprene, polybutadiene, polyacrylonitrile, polymethacrylonitrile, polymethyl-vinyl ketone, and poly-α-methylmethylvinyl ketone.

The polymer of the polymer block B may be either in advance cross-linked by a cross-linking monomer before forming a block copolymer or cross-linked by its own reaction. By having such a cross linkage, the positive hole-transport material can have its mechanical strength further increased.

As the cross-linking monomer for forming such the cross linkage, for example, when a double bond remains in the polymer block B, styrene, α-methylstyrene, p-methoxystyrene, acrylates, methacrylates, acrylonitrile, methacrylonitrile, butadiene, or isoprene may be used, while when other functional groups remain, various multifunctional compounds to cross-link between the functional groups may be used. For example, if the residual functional groups are isocyanates, polyamines or polyols may be used, while if epoxy groups remain, polyols, polyamines, polymercaptanes or polybasic acids may be used.

In forming a cross linkage, after forming a block copolymer, to a coating liquid for forming a photosensitive layer containing the block copolymer is added a cross-linking monomer and, if necessary, a polymerization initiator, and the liquid is coated and then heated to have polymer blocks B cross-linked with each other.

Block Copolymer

The method for the polymerization of the positive hole-transport material of the invention comprising a block copolymer of the above polymer block A and polymer block B is not particularly restricted, but the following methods are applicable.

(1) A method in which a block copolymer, after preparing a polymer block A, is formed by reaction of the specific functional group at the terminal of its molecular chain react with the specific functional group of a separately prepared polymer block B or by condensation of the block A with the block B after splitting off both functional groups.

(2) A method in which an anionic polymerizable monomer is added for addition polymerization to the active terminal which takes part in the growth reaction of the polymer block A remaining active following the reaction for preparation of the polymer block A.

Of the above two methods, the method (2) is better because it is difficult in practice to intentionally introduce specific functional groups to the terminals of both polymer blocks.

The proportion A/B by weight of the polymer block A and polymer block B in the block copolymer is preferably from 1/0.2 to 0.2/1. If the polymer block A is too small, the photosensitivity of the copolymer is lowered, while if the polymer block B is too small, the copolymer lacks the layer formability, mechanical strength and chargeability. That is, the polymer block A serves well for improving the photosensitivity due to its polysilane's nature, while the polymer block B contributes largely to improvements of the layer formability, mechanical strength and chargeability.

In preparing a photosensitive layer coating liquid, a solvent may or may not be used. To the coating liquid, as needed, are added a cross-linking monomer and a cross-linking reaction initiator, the liquid is coated to form a layer before being hardened, and the layer is then hardened by heat or light to thereby form a bridged structure-having layer.

As the cross-linking reaction initiator, for example, benzoyl peroxide, methyl-ethyl ketone peroxide, cumenehydro peroxide, azobutylonitrile or dicusyl oxide may be used.

Polymer Block C

The polymer block C is one constituting the so-called trunk of the graft copolymer.

The 'another polymer' that constitutes the polymer block C, although not particularly restricted as long as it enables to obtain a mechanically strong polymer, is preferably one selected from among unsaturated polyesters, epoxy resins and polyurethanes.

The unsaturated polyester includes those unsaturated polyesters obtained by homopolycondensation reaction and those unsaturated polyesters by co-condensation reaction, the former being of a construction synthesized by using one unsaturated polybasic acid and one polyhydric alcohol, the latter being of a construction synthesized by using an unsaturated polybasic acid, a polyhydric alcohol and at least one saturated polybasic acid. The unsaturated polybasic acid unit is provided with maleic acid, fumaric acid, itaconic acid, citraconic acid, tetrahydrophthalic acid, chloromaleic acid and/or anhydrides of these acids. The polyhydric alcohol unit is provided with ethylene glycol, diethylene glycol, glycerol, propylene glycol, neopentyl glycol, bisphenol, hydrogenated bisphenol or bisphenol-glycol ether. The saturated polybasic acid unit is provided with phthalic acid, tetraphthalic acid, isophthalic acid, tetrachlorophthalic acid, succinic acid, adipic acid, sebacic acid, azelaic acid, hexahydrophthalic acid and/or anhydrides of these acids.

As the unsaturated polyester, one having an epoxyacrylate construction of which the terminal group has a highly reactive acryl double bond and the principal chain has a bisphenol-A-type ether linkage may also be used.

The epoxy resin includes ones obtained from bisphenol-A-type epoxides, phenol-type epoxides such as novolak-type epoxides, alkylphenol-diglycidyl ethers, aromatic polyglycidyls, phenolphthalein epoxide, resorcinol epoxides; polyglycol-type epoxides, ester-type epoxides such as diglycidyl adipate, diglycidyl phthalate, diglycidyl dimerate, methaglycidyl methacrylate and polymers thereof etc; and N-glycidylamine-type epoxides.

As the polyurethane, linear polyurethanes such as polytetramethylenehexamethylurethane, polyurethane rubber, polyurethane adhesives; isocyanate rubber-type adhesives, prepolymer-type adhesives (polyol-isocyanate-type), isocyanate-modified polymer adhesives, polyurethane paint including thermally reactive-type polyurethanes, moisture-setting-type polyurethanes, oxygen-setting-type oil-modified polyurethanes, polyol-setting-type polyurethanes or catalyst-setting-type polyurethanes may be used.

The polymer of the polymer block B may be cross-linked with or without a cross-linking agent. By having a cross linkage, the positive hole-transport material can have its mechanical strength further increased.

The cross-linking agent for forming the cross linkage includes styrene, α-methylstyrene, p-methyoxystyrene, chlorostyrene, vinyl acetate, methacrylates, dialkyl phthalate, triallyl cyanurate, diallyl benzophosphonate, unsaturated fats and oils, and various multifunctional materials other than these vinyl-reactive monomers.

The cross linkage forming point of time is not particularly restricted, but it is preferable that a cross-linking agent be added upon the start of or after the graft copolymer-forming reaction to thereby make bridge formation of the polymer block C.

Graft Copolymer

The method for the polymerization of the positive hole-transport material of the invention comprising a graft copolymer of the above polymer block A and polymer block C is not particularly restricted, but the following methods are applicable.

(1) A method in which a graft copolymer is obtained by effecting a polymer block C-producing reaction simultaneously with a polymer block A-producing reaction or following completion of the producing reaction in its reaction system.

(2) A method in which a reaction for grafting the already produced polymer block C is effected simultaneously with a polymer block A-producing reaction or following completion of the producing reaction in its reaction system.

(3) A method in which a graft copolymer is obtained by effecting a polymer block A-producing reaction following completion of a polymer block C-producing reaction in its reaction system.

(4) A method in which a grafting reaction of the already produced polymer block A or a derivative thereof is effected simultaneously with a polymer block C-producing reaction or following completion of the producing reaction in its reaction system.

(5) A method in which a grafting reaction is effected between the separately obtained polymer block A or a derivative thereof and polymer block C.

The proportion A/C by weight of the polymer block A and polymer block C in the graft copolymer is preferably from 1/0.2 to 0.2/1. If the polymer block A is too small, the sensitivity of the copolymer is lowered, while if the polymer block C is too small, the copolymer lacks the layer formability, mechanical strength and chargeability. That is, the polymer block A serves well for improving the sensitivity due to its polysilane's nature, while the polymer block C contributes largely to improvements of the layer formability, mechanical strength and chargeability.

In preparing a photosensitive layer coating liquid, a solvent may or may not be used. To the coating liquid, as needed, are added a cross-linking monomer and a cross-linking reaction initiator, the liquid is coated to form a layer before being hardened, and the layer is then hardened by heat or light to thereby form a bridged structure-having layer.

As the cross-linking reaction initiator, for example, when the polymer block C is an unsaturated polyester, if necessary, a radical polymerization initiator is used, when the polymer block C is an epoxy resin, an amine or an alcohol or an anhydride thereof is used and when the polymer block C is a polyurethane, a tertiary amine, an organic tin compound, or a basic compound such as a naphthenate is used.

Electrophotographic Photoreceptor

The electrophotographic photoreceptor of the invention comprises an organic photoreceptor containing the aforementioned specific positive hole-transport material. That is, the electrophotographic photoreceptor of the invention basically has a function-separation-type organic photosensitive layer comprised in combination of the specific positive hole-transport material with a carrier-generation material, and the organic photosensitive layer is provided directly or through other layer on a conductive support.

The detailed construction of the organic photosensitive layer is not restricted, and includes various types as shown below:

(1) A construction wherein a carrier-transport layer and a carrier-generation layer are provided independently of each other (hereinafter called Construction (1)), (2) A construction wherein the carrier-generation material is not provided in the form of an independent layer but is dispersedly incorporated into a layer of the foregoing specific positive hole-transport material (hereinafter called Construction (2)).

According to such the function-separation-type organic photosensitive layer, since the carrier generation and the carrier transport are separately carried out by different materials, the range of choice of a carrier-generation material is so widened that the characteristics required for the image forming process, such as the surface potential, sensitivity to light, and stability when repeatedly used, are increased, and thus an excellent characteristics-having organic photoreceptor can be produced.

And, the specific positive hole-transport material of the invention, since it has in itself a high layer formability, is capable of forming the carrier-transport layer in Construction (1) or the photosensitive layer in Construction (2) without using a binder. The carrier-transport layer of Construction (1) or the photosensitive layer of Construction (2) may be formed with the foregoing specific positive hole-transport material alone or, as needed in order to give a desired characteristic, in combination with other materials. Such 'other materials' include, for example:

(1) Binder for Increasing Insulation

As the binder, a material compatible with the foregoing specific positive hole-transport material is used, such as polycarbonate, polyester, methacryl resin, acryl resin, polyvinyl chloride, polyvinylidene chloride, polystyrene, polyvinyl acetate, polyisoprene, polybutadiene, polyamide resin, polyurethane resin, a styrene copolymer resin such as styrene-butadiene copolymer or styrene-methyl methacrylate copolymer, an acrylonitrile-type copolymer resin such as vinylidene chloride-acrylonitrile copolymer, vinyl chloride-vinyl acetate copolymer, vinyl chloride-vinyl acetate-maleic anhydride copolymer, silicone resin, silicone-alkyd resin, phenol resin, styrene-alkyd resin, poly-N-vinylcarbazole, polyvinylbutyral, polyvinylformal or polyhydroxystyrene. These binder materials may be used alone or in combination. The ratio in combination of such binder materials is about 5 to 50% by weight of the portion other than the carrier-transport layer of Construction (1) and the carrier-generation material of the photosensitive layer of Construction (2).

(2) n-type carrier-transport material for lowering residual potential:

The n-type carrier-transport material includes tetracyanoethylene, tetracyanoquinodimethane, dichlorodicyanoparabenzoquinone, trinitrofluorenone, tetranitrofluorenone, fluorenylidenemalonodinitrile. Such the carrier-transport material may be added also to the carrier-generation layer in Construction (1).

The carrier-generation material is not particularly restricted as long as it absorbs infrared light from visible rays to generate a free carrier, and may be selected from inorganic and organic pigments.

The inorganic pigment includes, e.g., amorphous selenium, trigonal selenium, selenium-arsenic alloy, selenium-tellurium alloy and cadmium sulfide.

The organic pigment includes:
(1) azo-type pigments such as monoazo pigments, bisazo pigments, trisazo pigments, metal complex salt azo pigments;
(2) perylene-type pigments such as peryleic acid anhydride, peryleic acid imide;
(3) polycyclic quinone-type pigments such as anthraquinone derivatives, anthanthrone derivatives, dibenzopyrenequinone derivatives, pyranethrone derivatives, violanthrone derivatives, isoviolanthrone derivatives;
(4) indigoid-type pigments such as indigoid derivatives, thioindigoid derivatives; and
(5) phthalocyanine-type pigments such as metallic phthalocyanine, nonmetallic phthalocyanone.

Such the carrier-generation material is in itself lacking in layer formability, so that the material needs to be used in combination with a binder when forming an independent carrier-generation layer.

The binder for the carrier-generation layer in Construction (1), although not particularly restricted, is preferably a high-molecular polymer capable of forming a hydrophobic and insulating layer. As the high-molecular polymer, any of those similar to the previously exemplified materials as the binder for increasing the insulation can be used. These binder materials may be used alone or in a mixture thereof. The binder is used in an amount of preferably not more than 5 parts by weight to 1 part by weight of the carrier-generation material.

As the conductive support the following materials may be used, but are not limited thereto.
(1) A tabular or drum-shaped conductive support made of a metal such as aluminum, stainless steel.
(2) A conductive support prepared by laminating or vacuum depositing on a paper or plastic film support a thin layer of a metal such as aluminum, palladium.
(3) A conductive support prepared by coating or vacuum-depositing on a paper or plastic film support a conductive compound such as a conductive polymer, indium oxide, tin oxide, etc.

The following examples of the construction of the electrophotographic photoreceptor of the invention will be explained by making reference to the drawings.

Figure 1:
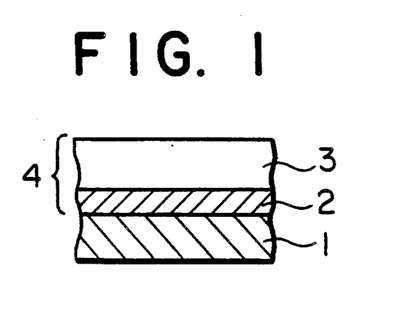
FIG. 1 through FIG. 6 are explanatory drawings showing cross-sectional views of the construction examples of the electrophotographic photoreceptor of the invention.

FIG. 1 is a drawing showing an example of the construction of an electrophotographic photoreceptor, in which on a conductive support 1 is provided a carrier-generation layer 2, and further on the layer is provided a specific positive hole-transport material-containing carrier-transport layer 3. In this example, an organic photosensitive layer 4 consists of the individually independent carrier-generation layer 2 and carrier-transport layer 3.

Figure 2:
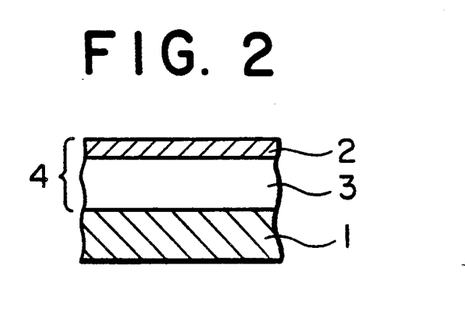

FIG. 2 shows a construction in which the carrier-generation layer 2 and carrier-transport layer 3 are arranged inversely to the order of those in the example in FIG. 1.

Figure 3:
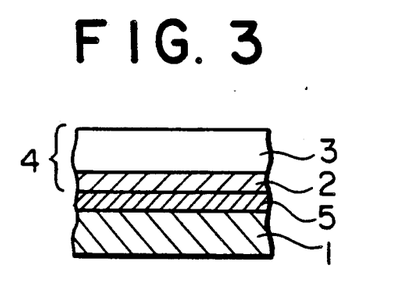

FIG. 3 shows a construction in which an intermediate layer is put in between the carrier-generation layer 2 and conductive layer 1 in the example in FIG. 1. The intermediate layer functions as, e.g., an adhesive layer or a barrier layer.

Figure 4:
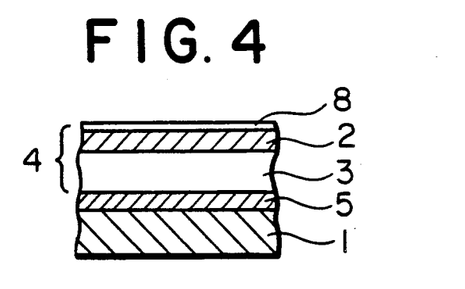

FIG. 4 shows a construction in which an intermediate layer is put in between the carrier-transport layer 3 and conductive support 1 in the example in FIG. 2, and on the carrier-generation layer 2 is provided an overcoat layer 8. The overcoat layer 8 is one provided as needed.

Figure 5:
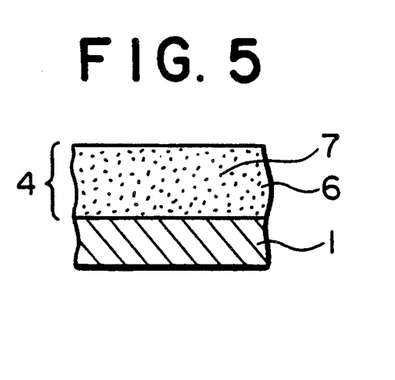

FIG. 5 shows a construction in which on the conductive support 1 is provided an organic photosensitive layer 4 comprised of a single layer prepared by dispersedly incorporating a particulate carrier-generation material 7 into a layer 6 containing a positive hole-transport material.

Figure 6:
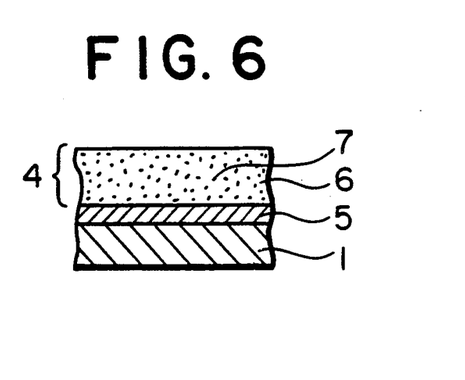

FIG. 6 shows a construction in which an intermediate layer 5 is put in between the organic photosensitive layer 4 and conductive support 1 in the example in FIG. 5.

Where the organic photosensitive layer 4 is a multilayer construction comprised of the carrier-generation layer 2 and carrier-transport layer 3, which of the carrier-generation layer 2 and the carrier-transport layer 3 should be an upper layer is desirable to be determined according to the charging polarity of the organic photosensitive layer 4. Namely, if the charging polarity is negative, it is advantageous to make the carrier-transport layer 3 an upper layer as shown in FIGS. 1 and 3.

As a means for forming the carrier-transport layer 3, although not particularly restricted, any of various methods such as a dip coating method, a spray coating method, a blade coating method, a roll coating method, a laminating coating method, a molten-extrusion method or the like may be used.

That is, the previously mentioned positive hole-transport material, since it is soluble in a solvent, can form a carrier-transport layer by the application of an ordinary coating method.

To the coating liquid may, as needed, be added a cross-linking monomer, and further added a cross-linking reaction initiator. In this instance, a tough carrier-transport layer 3 having a cross-linked structure can be formed.

The thickness of the carrier-transport layer 3, although may be altered if necessary, is normally 2 to 50 $\mu$m, and preferably 5 to 30 $\mu$m.

As methods for forming the carrier-generation layer 2, although not particularly restricted either, any of various methods may be used which include (1) a vacuum deposition method, (2) a method of coating a solution prepared by dissolving a carrier-generation material into an appropriate solvent, (3) a method of coating a dispersion obtained by dispersing a carrier-generation material to be in a particulate state by means of a ball mill or sand grinder, and, if necessary, mixing with a binder, into a dispersion medium.

The thickness of the carrier-generation layer 2 is normally 0.01 to 10 $\mu$m, and preferably 0.05 to 5 $\mu$m.

As is shown in FIG. 5 or FIG. 6, when the photosensitive layer 4 is formed by dispersedly incorporating a particulate-state carrier-generation material 7 into the positive hole-transport material-containing layer 6, the carrier-generation material 7 content is preferably 10 to 90% by weight of the photosensitive layer.

The foregoing intermediate layer 5 is a layer functioning as an adhesive layer or a barrier layer, which may be formed with the previously exemplified binder for the carrier-generation layer or otherwise may be formed with polyvinyl alcohol, ethyl cellulose, carboxymethyl cellulose or casein.

For the aforesaid overcoat layer 8 the resin used as the binder for the carrier-generation layer may be used. In order to help the carrier run in the above layer, it is preferable that the foregoing n-type carrier-transport material or a p-type carrier-transport material such as a pyrazoline derivative, a benzidine derivative, an oxazole derivative, an oxadiazole derivative, a polyphenylamine derivative, a styrylamine derivative or hydrazone be mixed into the layer. The thickness of the overcoat layer 8 is preferably 0.1 to 10 μm, and more preferably 0.5 to 5 μm.

EXAMPLES

The present invention is illustrated in detail by the following examples, but the invention is not limited to the examples.

EXAMPLE 1

(1) Into 100 ml of a refined and dehydrated tetrahydrofuran were dissolved 30.8 g (0.2 mole) of biphenyl under a dry nitrogen atmospheric condition, and to the solution were added 2.8 g (0.4 mole) of metallic lithium. The mixture was stirred for 2 hours at room temperature, and then cooled down to −78° C. by a dry ice-methanol method.

Subsequently, a solution prepared by dissolving 18.7 g (0.1 mole) of 1,1,2,2-tetramethyl-1,2-dichlorodisilane into 50 ml of a refined and dried tetrahydrofuran was slowly added dropwise to the above cooled liquid with stirring. After 2 hours of stirring, to the liquid kept at −78° C. while vigorously stirring was slowly added dropwise 1 ml of a 0.1 mole/litter of a butyl-lithium hexane solution.

By the above procedure, a solution containing a polymer block A comprised of polydimethylsilane having an active terminal ($-Si^{\ominus}$) of a number average molecular weight of 116,000 and a polymerization degree of 2000 was obtained.

(2) Then, a solution prepared by dissolving 20 g (0.2 mole) of methyl methacrylate into 100 ml of refined and dried tetrahydrofuran was slowly added dropwise to the above solution containing block polymer A kept at −78° C. with vigorously stirring.

By the above procedure, a solution containing a positive hole-transport material consisting of a block copolymer of a polymer block A comprising polydimethylsilane and a polymer block B comprising polymethyl methacrylate of a polymerization degree of 2000 was obtained.

(3) Subsequently, hexane was added to the above solution containing the positive hole-transport material to take out the precipitate. The precipitate was dissolved again into tetrahydrofuran, and then hexane was added again to take out the precipitate. By such the procedure, the biphenyl was removed.

After that, the lithium and chlorine were removed from the precipitate by a soxhlet extractor using methanol, whereby a refined positive hole-transport material was obtained.

EXAMPLE 2

(1) A solution containing a polymer block A comprising polydi-n-butyl-1,2-dichlorodisilane was obtained in the same manner as in Example 1 except that the 1,1,2,2-tetramethyl-1,2-dichlorodisilane of Example 1 was replaced by 35.5 g (0.1 mole) of 1,1,2,2-tetra-n-butyl-1,2-dichlorodisilane.

(2) A solution containing a positive hole-transport material comprised of a block copolymer of a polymer block A comprising polydi-n-butylsilane and a polymer block B comprising polybutyl methacrylate of a polymerization degree of 2000 was obtained in the same manner as in Example 1 except that the methyl methacrylate of Example 1 was replaced by 28.4 g (0.2 mole) of butyl methacrylate.

(3) In the same manner as in Example 1, a refined positive hole-transport material was obtained.

EXAMPLE 3

(1) In the same manner as in Example 1, a solution containing a polymer block A comprising polydimethylsilane was obtained.

(2) A solution containing a positive hole-transport material comprised of a block copolymer of a polymer block A comprising polydimethylsilane and a polymer block B comprising polystyrene of a polymerization degree of 2000 was obtained in the same manner as in Example 1 except that the methyl methacrylate of Example 1 was replaced by 20.8 g (0.2 mole) of styrene.

(3) To the above solution containing the positive hole-transport material was added tetrahydrofuran to dissolve the positive hole-transport material, and then added methanol to form a precipitate. The precipitate was taken out, then dissolved again into tetrahydrofuran and then methanol was added again to form a precipitate, and the precipitate was taken out. By the above procedure, the impurities including the biphenyl and lithium ions were removed, whereby a refined positive hole-transport material was obtained.

EXAMPLE 4

(1) In the same manner as in Example 1, a solution containing a polymer block A comprising polydimethylsilane was obtained.

(2) A solution containing a positive hole-transport material comprised of a block copolymer of a polymer block A comprising polydimethylsilane and a polymer block B comprising polyisoprene of a polymerization degree of 500 was obtained in the same manner as in Example 1 except that the methyl methacrylate of Example 1 was replaced by 3.4 g (0.05 mole) of isoprene.

(3) In the same manner as in Example 1, a refined positive hole-transport material was obtained.

EXAMPLE 5

(1) In the same manner as in Example 1, a solution containing a polymer block A comprising polydimethylsilane was obtained.

(2) A solution prepared by dissolving 50 g of a mixture of m-isopropenyl-α-α-dimethylbenzoyl isocyanate (TMI), n-butyl acrylate and methyl methacrylate (ratio by weight of 1:20:29) into 100 ml of dried and refined tetrohydrofuran was added to the above solution containing the polymer block A kept at −78° C., and the mixture was stirred for a while.

By the above procedure, a solution containing a positive hole-transport material comprised of a block copolymer of a polymer block A and a polymer block B comprising TMI-n-butyl acrylate-methyl methacrylate copolymer was obtained.

(3) In the same manner as in Example 1, a refined positive hole-transport material was obtained.

EXAMPLE 6

On a cylindrical aluminum drum-shaped conductive support was provided a 0.1 μm-thick intermediate layer comprised of vinyl chloride-vinyl acetate-maleic anhydride copolymer 'S-lec MF-10' (produced by Sekisui Chemical Co.).

One part by weight of the following Structural Formula 1-having dibromoanthanthrone 'Monolite Red 2Y' (produced by ICI) and 0.5 part by weight of polycarbonate resin 'Panlite L-1250' (produced by Teijin Chemical Ind. Co.) were mixed with 100 parts by weight of 1,2-dichloroethane, and the mixture was dispersed for 24 hours by means of a ball mill to prepare a coating liquid. The coating liquid was dip-coated to form a 0.5 μm dry thickness-having carrier-generation layer on the above-mentioned intermediate layer.

Subsequently, the positive hole-transport material prepared in Example 1 was dissolved into tetrahydrofuran to prepare a coating liquid, and the coating liquid was dip-coated to form a 20 μm dry thickness-having carrier-transport layer on the above carrier-generation layer, whereby an electrophotographic photoreceptor according to the invention was prepared.

Structural Formula 1

The above electrophotographic photoreceptor was loaded in a modified version of electrophotographic copier U-Bix 7090 (manufactured by KONICA Corporation), and the surface of the photoreceptor was negatively charged by a scorotron charger (grid voltage −6 kV). Subsequently, the electrophotographic photoreceptor was exposed imagewise to a black-and-white chart image to form an electrostatic latent image on the photoreceptor.

The electrostatic latent image was developed with a toner comprising 95% by weight styrene-methyl methacrylate-n-butyl methacrylate copolymer and 5% by weight carbon black.

The developed toner image was then transferred onto a plain paper and fixed to form a copy image.

On the other hand, after the image transfer, the residual toner remaining on the electrophotographic photoreceptor was removed by the blade of a cleaning device.

The above image forming process was repeated 10,000 times at each of environmental temperatures of 25° C. and 0° C., and then the characteristics of the electrophotographic photoreceptor were evaluated. The electrophotographic photoreceptor's linear speed in the copying operation was 440 mm/sec. The results are as follows:

(1) The potential changes in the dark image area and the white background area from the first copy to the 10,000th copy were as small as −15 V and −5 V, respectively, at an environmental temperature of 25° C. and as small as −20 V and −5 V, respectively, at an environmental temperature of 0° C.; thus it was confirmed that the photoreceptor exhibited stably excellent chargeability.

(2) In each of the first copy and the 10,000th copy, the reflection densities of the dark image area at the environmental temperatures were as sufficiently high as 1.3 or more, while the reflection densities of the white background area at the environmental temperatures were as sufficiently low as 0.01 or less; thus it was confirmed that the photoreceptor exhibited stably excellent chargeability and sensitivity.

(3) From the first copy through the 10,000th copy, each copy image was excellent in the chart image reproducibility and free of any defects such as white or dark streaks due to scratchs on the electrophotographic photoreceptor. After the 10,000th copy was made, when the surface of the electrophotographic photoreceptor was observed through a magnifier, no damage such as scratches, peelings, was found; this fact proves that the mechanical strength of the electrophotographic photoreceptor is large enough to withstand the scratching force of toner or a cleaning blade.

EXAMPLE 7

An electrophotographic photoreceptor for the invention was prepared in the same manner as in Example 6 except that as a positive hole-transport material, the positive hole-transport material that was obtained in Example 2 was used to form a carrier-transport layer. This electrophotographic photoreceptor was tested in the same manner as in Example 6, and the results were as satisfactory as in Example 6.

EXAMPLE 8

An electrophotographic photoreceptor for the invention was prepared in the same manner as in Example 6 except that as a positive hole-transport material a mixture of the positive hole-transport material that was obtained in Example 5 and butylene glycol (ratio by weight of 50:0.46 (twice the equivalent)) was used to form a carrier-transport layer.

The above electrophotographic photoreceptor was tested in the same manner as in Example 6, and the results were as satisfactory as in Example 6.

EXAMPLE 9

An electrophotographic photoreceptor for the invention was prepared in the same manner as in Example 6 except that a carrier-generation layer was formed in the following manner and as a positive hole-transport material the positive hole-transport material that was obtained in Example 3 was used.

Carrier-Generation Layer

One part by weight of a bisazo pigment having the following Structural Formula 2 and 0.5 part by weight of polycarbonate resing 'Panlite L-1300' (product of Teijin Chemical Industry Co.) were mixed with 100 parts by weight of tetrahydrofuran, and dispersed for 24 hours by a ball mill to prepare a coating liquid. The coating liquid was dip-coated to form a 0.4 μm dry thickness-having carrier-generation layer of the intermediate layer.

Structural Formula 2

The above electrophotographic photoreceptor was tested in the same manner as in Example 6, and the following results were obtained.

(1) The changes in the potentials of the dark image area and the white background area from the first copy to the 10,000th copy were as small as −30 V and −10 V, respectively, at an environmental temperature of 25° C., and as small as −40 V and −10 V, respectively, at an environmental temperature of 0° C.; thus it was confirmed that the photoreceptor exhibited stably excellent chargeability.

(2) In each of the first copy and the 10,000th copy, the reflection density of the dark image area is as high as not less than 1.3 at either environmental temperature, while that of the white background image area is as low as 0.01 or less; thus it was confirmed that the photoreceptor exhibited stably excellent chargeability and sensitivity.

(3) Any one of the copies made in the first through 10,000th copying operations is excellent in the chart image reproduction and free of any defects such as white or dark streaks due to damage of the photoreceptor, and as a result of the through-magnifier observation of the surface of the photoreceptor after making the 10,000th copy, no damage such as peelings was found; thus it was confirmed that the photoreceptor was excellent in the mechanical strength.

EXAMPLE 10

An electrophotographic receptor of the invention was prepared in the same manner as in Example 9 except that as a positive hole-transport material the positive hole-transport material that was obtained in Example 4 was used to form a carrier transport layer.

The above electrophotographic photoreceptor was tested in the same way as in Example 6, and almost the same satisfactory results as in Example 9 were obtained.

EXAMPLE 11

On an aluminum-evaporated conductive polyester film support was provided a 0.1 μm-thick intermediate layer comprised of a vinyl chloride-vinyl acetate-maleic anhydride copolymer 'S-lec MF-10' (product of Sekisui Chemical Co.).

On the intermediate layer was coated a liquid prepared by dissolving the positive hole-transport material that was obtained in Example 1 into tetrahydrofuran to form thereon a 20 μm dry thickness-having carrier transport layer.

One part by weight of a carrier-generation material represented by the following structural formula 3 and 1 part by weight of the positive hole-transport material that was obtained in Example 1 were mixed into 50 parts by weight of tetrahydrofuran and dispersed for 24 hours by a ball mill to prepare a coating liquid. The coating liquid was spray-coated on the above carrier transport layer to form a carrier generation layer having a dry thickness of 5 μm, whereby an electrophotographic photoreceptor for the invention was prepared.

Structural Formula 3

The above electrophotographic photoreceptor was tested at an environmental temperature of 25° C. in the same manner as in Example 6 except that the charging voltage was changed to +6 kV, and the toner was replaced by a negatively chargeable toner comprised principally of polyester. The results are as follows:

(1) The changes in the potentials of the dark image area and the white background area from the first copy to the 10,000th copy were as small as 50 V and 20 V, respectively; thus it was confirmed that the photoreceptor exhibited stably excellent chargeability.

(2) The densities of the dark image area and the white background area of each copy up to 10,000th copy were as satisfactory as in Example 6.

(3) The chart image reproduction in each copy up to 10,000th copy was also satisfactory with no image defects at all, and no damage was found on the photoreceptor.

EXAMPLE 12

(1) By the same procedure as in Example 1, a solution containing a polymer block A comprised of polymethylsilane having an active terminal ($-Si^{\ominus}$) of a number average molecular weight of 116,000 and a polymerization degree of 2000 was obtained.

(2) Then, to the above solution of the polymer block A kept at −78° C. with vigorously stirring was slowly added dropwise a solution prepared by dissolving 0.04 g (0.2 millimole) of m-isopropenyl-α,α-dimethylbenzyl-isocyanate into 2 ml of dried tetrahydrofuran. The precipitate obtained by adding methanol to the solution was dissolved into tetrahydrofuran was precipitated again by methanol, and the precipitate was dried, whereby a mixture of the compounds having the following formulas was obtained.

(n = 2, initial terminal: C₄H₉, Mwt: 116524)

(3) Twenty grams of a mixture of tolylenediisocyanate 'Desmodur T' (Mwt: 174), triisocyanate 'Desmodur R' (Mwt: 367) and hexamethylene glycol (Mwt: 118) in a molar ratio of 4.9:0.08:5.02 were mixed with 20 g (0.17 millimole) of the above-obtained mixture and 50 ml of toluene to thereby prepare a coating liquid.

EXAMPLE 13

(1) To the reaction liquid after the dropwise addition of the m-isopropenyl-α,α-dimethylbenzyl-isocyanate solution in (2) of Example 12 were added 1.5 ml of water and 0.5 ml of triethylamine (catalyst for the hydrolysis of the cyanate) to be refluxed by heat for 5 hours. Methanol was added to the liquid to obtain a precipitate. The precipitate was dissolved again into tetrahydrofuran and then precipitated by adding methanol. The final precipitate was dried to thereby obtain a substance having the following structural formula:

(Mwt: 116466)

(2) To 20 g of the above substance were added 10 g of 'Epikote 8', stirred for 2 hours at room temperature, then mixed with 10 g of bisphenol-type epoxide 'Epikote 815' and 20 ml of toluene to thereby prepare a coating liquid.

EXAMPLE 14

(1) In the same manner as in Example 1, a solution containing a polymer block A comprising polydimethylsilane was obtained.

(2) Then, to the above polymer block A solution were added 3.4 g (0.01 mole) of diglycidylbisphenol-A, and sufficiently stirred to effect their reaction. Ethanol was added to the reaction liquid for precipitation, and the precipitate was reprecipitated to be refined in a hydrofuran-ethanol mixture solvent to remove the bisphenyl-unreacted diglycidylbisphenol-A and metallic lithium to thereby isolate the precipitate, which was then dried.

This dried substance has the following structural formula:

(3) The whole quantity of the dried substance was mixed with 19 g of a bisphenol-type epoxide 'Epikote 815' (epoxy equivalent to 190), 2.06 g (10.8 PHR) of diethylenetriamine and 10 ml of xylene, and a carrier-generation material to thereby prepare a coating liquid.

EXAMPLE 15

(1) In the same manner as in Example 1, a solution containing a polymer block A comprising polydimethylsilane was obtained.

(2) Then, to the above polymer block A solution was added a solution prepared by dissolving 11.6 g of a (4-chloromethyl)-styrene-styrene copolymer (molar ratio=1:10) having a number average molecular weight of 150,000, and heated to 50° C. with stirring, and then this was poured into a large quantity of ethanol thereby to be precipitated. The precipitate was dissolved again in tetrahydrofuran, then poured into ethanol to be precipitated again. The final precipitate was isolated and dried, whereby a positive hole-transport material composed of a graft copolymer consisting of a polymer block A comprising polydimethylsilane and a polymer block B comprised principally of polystyrene was obtained. The graft copolymer is inferred to have the following structural formula:

(3) Twenty grams of the positive hole-transport material were dissolved into 200 ml of tetrahydrofuran to thereby prepare a coating liquid.

EXAMPLE 16

(1) In the same manner as in Example 1, a solution containing a polymer block A comprising polydimethylsilane was obtained.

(2) To the above polymer block A solution was added a solution prepared by dissolving 2.4 g (0.01 mole) of N,N-di(trimethylsilyl)-3-chloropropylamine (molecular weight 237.5) into 10 ml of refined dry tetrahydrofuran, and the mixture was heated to 40° C. with stirring for 1 hour, and 1 ml of acetic acid was added and further stirred for 1 hour, and then ethanol was added to it for precipitation. The precipitate was dissolved again into 500 ml of tetrahydrofuran, and then poured into ethanol to be precipitated again, and the final precipitate was dried to obtain a compound having the following structural formula:

(3) Twenty grams of this compound was mixed with a mixture of tolylenediisocyanate 'Desmodur T', triisocyanate 'Desmodur R' and hexamethylene gycol in a molar ratio of 4.9:0.08:5.02 to thereby prepare a coating liquid.

EXAMPLE 17

The dried substance obtained in (2) of Example 5 was used to prepare a coating liquid in the same manner as in (2) of Example 2.

EXAMPLE 18

In the same procedure as in Example 6, on a cylindrical aluminum drum-type conductive support was provided a 0.1 μm-thick intermediate layer and a 0.5 μm-thick carrier-generation layer.

Subsequently, the coating liquid obtained in Example 12 was dip-coated on the above-prepared carrier-generation layer to thereby form a 20 μm dry thickness-having carrier-transport layer, whereby an electrophotographic photoreceptor of the invention was prepared.

The above electrophotographic photoreceptor was evaluated in the same procedure as in Example 6. The results are as follows:
(1) The potential changes in the dark image area and the white background area from the first copy to the 10,000th copy were as small as −20 V and −5 V, respectively, at an environmental temperature of 25° C. and as small as −25 V and −5 V, respectively, at an environmental temperature of 0° C.; thus it was confirmed that the photoreceptor exhibited stably excellent chargeability.
(2) In each of the first copy and the 10,000th copy, the reflection densities of the dark image area at the environmental temperatures are as sufficiently high as 1.3 or more, while the reflection densities of the white background area at the environmental temperatures are as sufficiently low as 0.01 or less; thus it was confirmed that the photoreceptor exhibited stably excellent chargeability and sensitivity.
(3) From the first copy through the 10,000th copy, each copy image was excellent in the chart image reproducibility and free of any defects such as white or dark streaks due to scratches on the electrophotographic photoreceptor. After the 10,000th copy was made, when the surface of the electrophotographic photoreceptor was observed through a magnifier, no damage such as scratches, peelings, etc. was found; this fact proves that the mechanical strength of the electrophotographic photoreceptor is large enough to withstand the scratching force of toner or a cleaning blade.

EXAMPLE 19

An electrophotographic photoreceptor for the invention was prepared in the same manner as in Example 18 except that the coating liquid containing positive hole-transport material obtained in Example 13 was used to form a 20 μm-thick carrier-transport layer, which was then subjected to post-treatment by heating at 100° C. for 30 minutes.

The above electrophotographic photoreceptor was tested in the same manner as in Example 6, and the results were as satisfactory as in Example 18.

EXAMPLE 20

An electrophotographic photoreceptor for the invention was prepared in the same manner as in Example 18 except that a carrier-generation layer was formed in the same manner as in Example 9, and the coating liquid obtained in Example 14 were used to form a carrier-transport layer.

The above electrophotographic photoreceptor was tested in the same manner as in Example 6. The results were as follows: (1) The potential changes in the dark image area and the white background area from the first copy to the 10,000th copy were as small as −35 V and −10 V, respectively, at an environmental temperature of 25° C. and as small as −45 V and −10 V, respectively, at an environmental temperature of 0° C.; thus it was confirmed that the photoreceptor exhibited stably excellent chargeability.
(2) In each of the first copy and the 10,000th copy, the reflection densities of the dark image area were as high as 1.3 or more and of the white background area were as sufficiently low as 0.01 or less at any of the environmental temperatures; thus it was confirmed that the photoreceptor exhibited stably excellent chargeability and sensitivity.
(3) From the first copy through the 10,000th copy, the chart image reproduction was excellent, and no defects such as white or dark streaks due to damage of the photoreceptor were found. As a result of the through-magnifier-observation of the surface of the electrophotographic photoreceptor after making the 10,000th copy, no defects such as scratches and peelings were found; thus it was confirmed that the photoreceptor had a large mechanical strength.

EXAMPLE 21

An electrophotographic photoreceptor for the invention was prepared in the same manner as in Example 20 except that the coating liquid obtained in Example 15 was used to form a carrier-transport layer.

The above electrophotographic photoreceptor was tested in the same manner as in Example 6, and the results were almost the same as in Example 20.

EXAMPLE 22

On an aluminum-evaporated conductive polyester film support was provided a 0.1 μm-thick intermediate layer comprised of a vinyl chloride-vinyl acetate-maleic anhydride copolymer 'S-lec MF-10' (product of Sekisui Chemical Co.).

Then, the coating liquid containing the positive hole-transport material obtained in Example 16 was dip-coated on the above intermediate layer to form a 20 μm dry thickness-having carrier-transport layer.

One part by weight of a carrier-generation material having the following structural formula was mixed with 180 parts by weight of toluene, the mxiture was dispersed for 24 hours by a ball mill, and then mixed with the coating liquid obtained in Example 16 (in parts by weight in terms of solid content). This mixture was spray-coated on the above carrier-transport layer to form a 5 μm dry thickness-having carrier-generation layer, whereby an electrophotographic photoreceptor of the invention was prepared.

The above electrophotographic photoreceptor was tested at an environmental temperature of 25° C. in the same manner as in Example 6 except that the charging voltage was changed to +6 kV, and the toner was replaced by a negatively chargeable toner comprised principally of polyester. The results are as follows:

(1) The potential changes in the dark image area and the white back ground area from the first copy to the 10,000th copy were as small as 60 V and 10 V, respectively; thus it was confirmed that the photoreceptor exhibited stably excellent chargeability.

(2) The densities of the dark image area and the white background area of each copy up to 10,000th copy were as satisfactory as in Example 6.

(3) The chart image reproduction in each copy up to 10,000th copy was also satisfactory with no image defects at all, and no damage was found on the photoreceptor.

EXAMPLE 23

An electrophotographic photoreceptor of the invention was prepared in the same manner as in Example 22 except that in place of the coating liquid obtained in Example 16, the coating liquid obtained in Example 17 was used to form a carrier-transport layer and a carrier-generation layer.

The above electrophotographic photoreceptor was tested in the same manner as in Example 6, and the results were satisfactory likewise.

COMPARATIVE EXAMPLE 1

A comparative electrophotographic photoreceptor was prepared in the same manner as in Example 6 except that the carrier-transport layer of Example 6 was formed as follows:

Formation of a Carrier-Transport Layer

A polymer block A comprising the polydimethylsilane obtained by subjecting the solution prepared by the process (1) to the treatment (3) of Example 1 was dissolved into tetrahydrofuran to thereby prepare a coating liquid. The coating liquid was dip-coated to form a 20 μm dry thickness-having carrier-transport layer.

The above comparative electrophotographic photoreceptor was tested at an environmental temperature of 25° C. in the same manner as in Example 6, and the following results were obtained.

(1) The potential changes in the dark image area and the white background area from the first copy to the 10,000th copy were as small as −20 V and −10 V, which were little different from Example 6.

(2) The density of the white background area was almost the same as in Example 6, but the density of the dark image area was as consistently small as 0.6 or less; thus the comparative sample was inferior in the chargeability to the electrophotographic photoreceptor of Example 6.

(3) The 10,000th copy image had many dark streaks. The dark streaks-appearing portion of the surface of the electrophotographic photoreceptor, when observed through a magnifier, was found out to have damage such as cracks and peelings; this fact proves that the mechanical strength of the carrier-transport layer is so small that the layer is liable to be damaged by the scratching force of toner or a cleaning blade.

COMPARATIVE EXAMPLE 2

A comparative electrophotographic photoreceptor was prepared in the same manner as in Example 6 except that the carrier-transport layer of Example 6 was replaced by a 20 μm dry thickness-having carrier-transport layer which was formed by dip-coating a solution prepared by dissolving 5 parts by weight of a carrier-transport material represented by the following structural Formula 4 and 5 parts by weight of polycarbonate resin 'Panlite L-1250' into 100 parts by weight of 1,2-dichloroethane.

Structural Formula 4

The above comparative electrophotographic photoreceptor was tested in the same manner as in Example 6, and the following results were obtained.

(1) It was confirmed that the potential changes in the dark image area and the white background area from the first copy to the 10,000th copy were as large as 40 V and 70 V, respectively, at an environmental temperature of 25° C., and as large as 110 V and 200 V, respectively, at an environmental temperature of 0° C.

(2) The reflection densities of the dark image area were constantly 1.3 or more, whereas the reflection densities of the white background area were high and as largely changed to produce a fog as from 0.2 in the first copy to 0.35 in the 10,000th copy at an environmental temperature of 25° C., and from 0.35 in the first copy to 0.45 in the 10,000th copy at an environmental temperature of 0° C. Such densities caused fogging in the white background area.

(3) No defects such as streaks due to damage of the electrophotographic photoreceptor were found on the reproduced image in the first copy through the 10,000th copy, and the electrophotographic photoreceptor's mechanical strength against the scratching force of toner or a cleaning blade was almost the same as in Example 6.

What is claimed is:

1. An electrophotographic photoreceptor having a photosensitive layer comprising a carrier generation material a block copolymer including a polymer block A comprising polysilane represented by the following formula (a)

wherein $R^1$, $R^2$, $R^3$, $R^4$, $R^5$ and $R^6$ are each a hydrogen atom, a substituted or unsubstituted alkyl group, a substituted or unsubstituted aryl group, a substituted or unsubstituted alkoxy group, a substituted or unsubstituted silyl group, a substituted or unsubstituted silylidene group or a substituted or unsubstituted silylidyne group, provided that groups represented by said atoms or groups each represented by $R^1$ through $R^6$ are either the same with or different from each other; m, n and p represent each a proportion of monomer units contained in said polysilane, and a polymer block B comprising a polymer of an anionic polymerizable monomer selected from the group consisting of styrene and derivatives thereof, α-methylstyrene and derivatives thereof, acrylates, methacrylates, substituted and unsubstituted isoprenes, substituted and unsubstituted butadienes, acrylonitriles, methacrylonitriles, and alkylvinylketones; or a hole transporting graft copolymer composed of said polymer block A and a polymer block C comprising a polymer selected from the group consisting of unsaturated polyester resins, epoxy resins and polyurethane resins.

2. The photoreceptor of claim 1, said polysilane has a polymerization degree of from 10 to 50,000.

3. The photoreceptor of claim 1, said polymer of said polymer block B has a cross-linkage.

4. The photoreceptor of claim 1, wherein said polymer block A and said polymer block B are contained in said block copolymer in a portion A/B of from 1/0.2 to 0.2/1 by weight.

5. The photoreceptor of claim 1, said another polymer of said polymer block C has a cross-linkage.

6. The photoreceptor of claim 1, wherein said polymer block A and said polymer block C are contained in said graft copolymer in a portion A/C of from 1/0.2 to 0.2/1 by weight.

* * * * *